US011863841B2

(12) United States Patent
Qiang et al.

(10) Patent No.: US 11,863,841 B2
(45) Date of Patent: Jan. 2, 2024

(54) VIDEO PLAYING CONTROL METHOD AND SYSTEM

(71) Applicant: SHANGHAI BILIBILI TECHNOLOGY CO., LTD., Shanghai (CN)

(72) Inventors: Chengcheng Qiang, Shanghai (CN); Nanling Zheng, Shanghai (CN); Yufeng Xie, Shanghai (CN); Qinglian Zhang, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 54 days.

(21) Appl. No.: 17/773,597

(22) PCT Filed: Aug. 18, 2020

(86) PCT No.: PCT/CN2020/109836
§ 371 (c)(1),
(2) Date: Apr. 30, 2022

(87) PCT Pub. No.: WO2021/082642
PCT Pub. Date: May 6, 2021

(65) Prior Publication Data
US 2022/0385989 A1 Dec. 1, 2022

(30) Foreign Application Priority Data
Oct. 30, 2019 (CN) .......................... 201911046202.9

(51) Int. Cl.
H04N 21/6587 (2011.01)
H04N 21/2187 (2011.01)
H04N 21/44 (2011.01)

(52) U.S. Cl.
CPC ..... *H04N 21/6587* (2013.01); *H04N 21/2187* (2013.01); *H04N 21/44004* (2013.01)

(58) Field of Classification Search
CPC .......... H04N 21/6587; H04N 21/2187; H04N 21/44004; H04N 21/2393; H04N 21/47202
See application file for complete search history.

(56) References Cited

U.S. PATENT DOCUMENTS 10,694,220 B2 * 6/2020 Ji ....................... H04N 21/2407
2014/0033073 A1 1/2014 Pegg
(Continued)

FOREIGN PATENT DOCUMENTS

CN 101552909 A 10/2009
CN 101651665 A 2/2010
(Continued)

OTHER PUBLICATIONS

International Patent Application No. PCT/CN2020/109836; Int'l Search Report; dated Nov. 19, 2020; 3 pages.

*Primary Examiner* — Oschta I Montoya
(74) *Attorney, Agent, or Firm* — BakerHostetler

(57) ABSTRACT

The present application provides techniques of controlling playing videos. The techniques comprise sending a live streaming request to a server according to a user instruction; receiving live streaming data pushed by the server based on the live streaming request and a configuration parameter configured to a live streaming status; playing a video based on the live streaming data; and controlling a speed of playing the video based on the configuration parameter and unplayed live streaming data in the live streaming data.

13 Claims, 7 Drawing Sheets

(56) References Cited

U.S. PATENT DOCUMENTS

| | | | | |
|---|---|---|---|---|
| 2014/0173055 A1* | 6/2014 | Yu | ............................ | H04L 65/80 |
| | | | | 709/219 |
| 2015/0074698 A1 | 3/2015 | Pinto et al. | | |
| 2015/0234571 A1 | 8/2015 | Lee et al. | | |
| 2015/0358686 A1* | 12/2015 | Xu | ................... | H04N 21/44004 |
| | | | | 725/62 |
| 2016/0088050 A1* | 3/2016 | Einarsson | ............. | H04L 65/612 |
| | | | | 709/231 |
| 2021/0021895 A1* | 1/2021 | Li | ...................... | H04N 21/4331 |

FOREIGN PATENT DOCUMENTS

| | | | |
|---|---|---|---|
| CN | 102271280 | A | 12/2011 |
| CN | 103338393 | A | 10/2013 |
| CN | 104079955 | A | 10/2014 |
| CN | 105872576 | A | 8/2016 |
| CN | 106331766 | A | 1/2017 |
| CN | 107205160 | A | 9/2017 |
| CN | 107396171 | A | 11/2017 |
| CN | 108235136 | A | 6/2018 |
| CN | 109194975 | A | 1/2019 |

\* cited by examiner

VIDEO PLAYING CONTROL METHOD AND SYSTEM

CROSS-REFERENCE TO RELATED APPLICATION

The present application is the U.S. National Stage of International Application No. PCT/CN2020/109836, filed on Aug. 18, 2020, which Chinese Patent Application No. 201911046202.9, filed on Oct. 30, 2019, and entitled "Method and system of video playing control", both of which are incorporated herein by reference in their entireties.

TECHNICAL FIELD

Embodiments of the present application relate to the field of computers, and in particular to a method and system of video playing control, a device, and a computer-readable storage medium.

BACKGROUND

With the development of Internet services, live video streaming has become increasingly popular among viewers. A live streamer may create a live video streaming room on a website over the Internet, and perform a live streaming for the viewers of the live video streaming room. The viewers may watch a video showing the live streamer of the live video streaming room and also hear the voice of the live streamer, and may further interact with the live streamer by posting bullet comments, giving gifts, etc. However, the inventor has appreciated that, a time when a live streamer terminal outputs video data may be not synchronous with a time when a viewer terminal plays the video data, that is, there may be a delay in playing. For example, when a network is not stable, a live video freeze is prone to occur on the viewer terminal, and further prolong duration of the delay in playing. Consequently, a feedback cannot be returned in time during interaction between a live streamer and a viewer, and an effect of the live video streaming is impaired.

Therefore, one of the technical problems to be solved at present is how to improve synchronization of a time when a live streamer terminal outputs video data and a time when a viewer terminal plays the video data, that is, to reduce a time difference between video pushing on the live streamer terminal and video playing on the viewer terminal.

SUMMARY

An objective of embodiments of the present application is to provide a method and system of video playing control, a computer device, and a computer-readable storage medium, to solve a technical problem of poor synchronization of a time when a live streamer terminal outputs video data and a time when a viewer terminal plays the video data.

An aspect of the embodiments of the present application provides a method of video playing control, where the method includes: sending a live streaming request to a server according to a user instruction; receiving live streaming data pushed by the server according to the live streaming request and a configuration parameter for assessing a live streaming status; and playing the live streaming data, and controlling a video playing speed according to the configuration parameter and unplayed live streaming data in the live streaming data.

Optionally, the live streaming request includes a channel identifier of a target live streaming channel, and the channel identifier is used to instruct the server to return a configuration parameter adapted for the target live streaming channel.

Optionally, the configuration parameter is determined by the server according to a type of a live streaming scenario.

Optionally, playing the live streaming data, and controlling a video playing speed according to the configuration parameter and unplayed live streaming data in the live streaming data includes: buffering the live streaming data into a data buffer; playing the live streaming data in the data buffer, and detecting a data size of unplayed live streaming data in the data buffer at a predetermined frequency; and controlling the video playing speed according to the configuration parameter and the data size of the unplayed live streaming data.

Optionally, controlling the video playing speed according to the configuration parameter and the data size of the unplayed live streaming data includes: determining a live streaming delay duration according to the data size of the unplayed live streaming data; calculating a target ratio of the live streaming delay duration to the configuration parameter; and adjusting the video playing speed from a first video playing speed to a second video playing speed according to the target ratio.

Optionally, when the target ratio is greater than a first value, the second video playing speed is a first number of times as fast as a default video playing speed; and when the target ratio is greater than a second value and less than the first value, the second video playing speed is a second number of times as fast as the default video playing speed, where the first value is greater than the second value that is greater than 1, and the first number of times is greater than the second number of times that is greater than 1.

Optionally, the second video playing speed is 1 time to 1.1 times as fast as the default video playing speed.

An aspect of the embodiments of the present application further provides a system of video playing control, including: a request means configured to send a live streaming request to a server according to a user instruction; a receiving means configured to receive live streaming data pushed by the server according to the live streaming request and a configuration parameter for assessing a live streaming status; and a playing means configured to play the live streaming data, and control a video playing speed according to the configuration parameter and unplayed live streaming data in the live streaming data.

An aspect of the embodiments of the present application further provides a computer device, including a memory, a processor, and computer-readable instructions that are stored on the memory and capable of running on the processor, where when the computer-readable instructions are executed by the processor, the following steps are implemented: sending a live streaming request to a server according to a user instruction; receiving live streaming data pushed by the server according to the live streaming request and a configuration parameter for assessing a live streaming status; and playing the live streaming data, and controlling a video playing speed according to the configuration parameter and unplayed live streaming data in the live streaming data.

An aspect of the embodiments of the present application further provides a computer-readable storage medium, where the computer-readable storage medium stores computer-readable instructions, and the computer-readable instructions are executable by at least one processor to cause the at least one processor to perform the following steps:

sending a live streaming request to a server according to a user instruction; receiving live streaming data pushed by the server according to the live streaming request and a configuration parameter for assessing a live streaming status; and playing the live streaming data, and controlling a video playing speed according to the configuration parameter and unplayed live streaming data in the live streaming data.

According to the method and system of video playing control, the device, and the computer-readable storage medium that are provided in the embodiments of the present application, the video playing speed is controlled according to the configuration parameter and the unplayed live streaming data in the live streaming data. When a delay in a live streaming occurs, a time difference between video pushing on a live streamer terminal and video playing on a viewer terminal can be reduced, and therefore, a feedback can be returned in time during interaction between a live streamer and a viewer, to enhance an effect of the live video streaming.

DETAILED DESCRIPTION OF EMBODIMENTS

In order to make the objectives, technical solutions, and advantages of the present application clearer, the present application will be described in further detail below in conjunction with the accompanying drawings and embodiments. It should be understood that the specific embodiments described here are merely intended to explain the present application, but are not intended to limit the present application. All other embodiments obtained by those of ordinary skill in the art based on the embodiments of the present application without creative efforts shall fall within the scope of protection of the present application.

It should be noted that the descriptions related to "first", "second", etc. in the present application are merely used for the illustrative purpose, and should not be construed as indicating or implying the relative importance thereof or implicitly indicating the number of technical features indicated. Thus, features defined with "first" and "second" may explicitly or implicitly include at least one of the features. Additionally, technical solutions among various embodiments can be combined with each other, but they must be based on the realization by those of ordinary skill in the art. When a combination of technical solutions is contradictory or cannot be realized, it should be considered that such a combination of the technical solutions does not exist, and does not fall within the scope of protection of the present application claimed, either.

Figure 1:
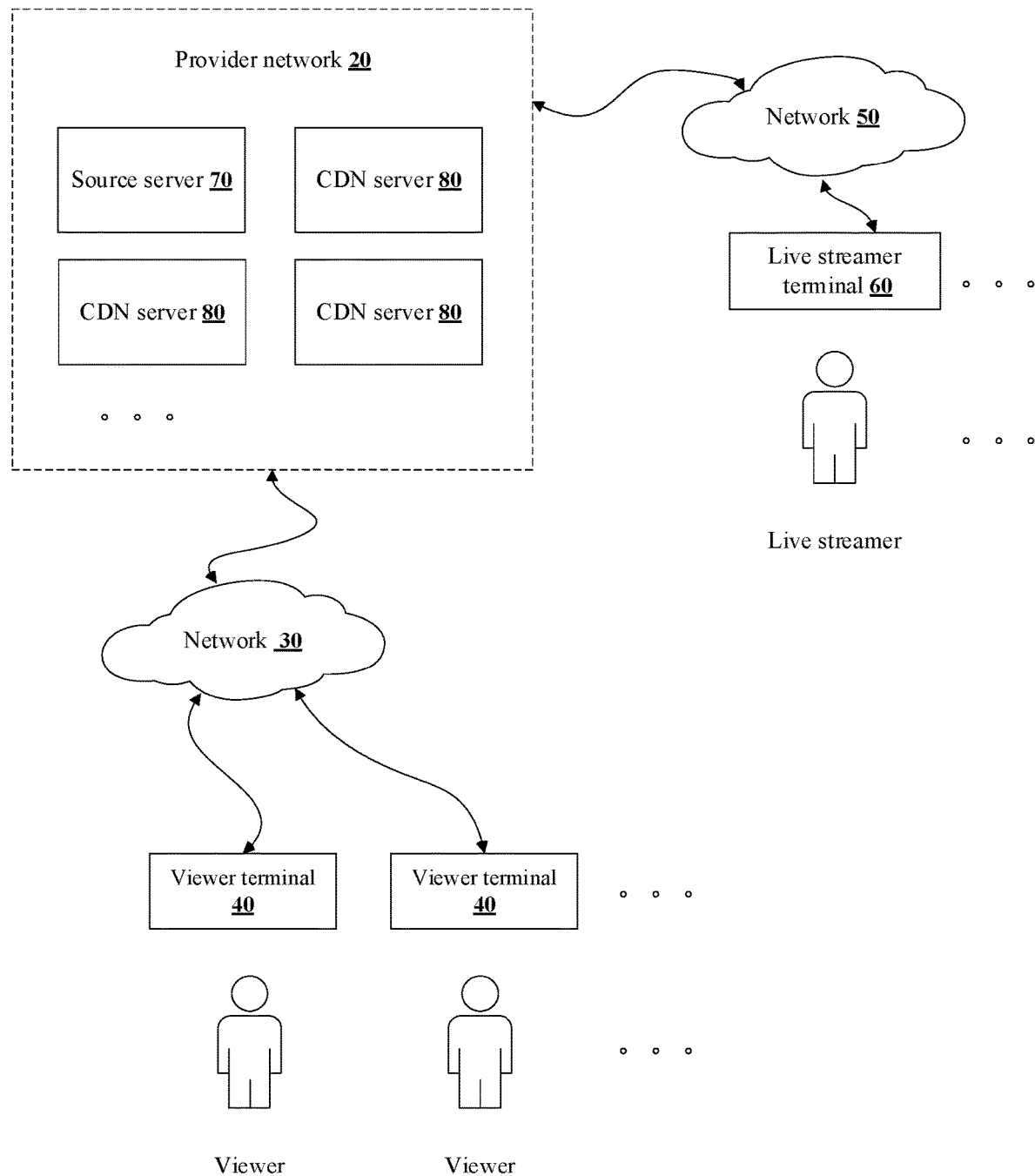
FIG. 1 is a schematic diagram schematically showing an environment application according to an embodiment of the present application.

FIG. 1 is a schematic diagram schematically showing an environment application according to an embodiment of the present application. In an exemplary embodiment, a provider network 20 may be connected to a plurality of viewer terminals 40 via one or more networks 30, and the provider network 20 may be further connected to a plurality of live streamer terminals 60 via one or more networks 50.

In an exemplary embodiment, a source server 70 may be implemented as a part of the provider network 20. In other embodiments, the source server 70 may be managed by an independent service provider other than a service provider of the provider network 20.

The source server 70 may include a content streaming service such as an Internet protocol video streaming service. The content streaming service may be configured to distribute content by using various transmission technologies. The source server 70 may be configured to provide content such as a video, audio, text data, a combination thereof and/or the like provided by the live streamer terminals 60. The content may include content streams (for example, video streams, audio streams and information streams), content files (for example, video files, audio files, and text files) and/or other data.

The provider network 20 may be located in a data center, for example, in a single room, or may be distributed at different geographical positions (for example, in a plurality of rooms). The provider network 20 may provide services via the one or more networks 30, and may provide services via the one or more networks 50. The network 30 or the network 50 includes various network devices, for example, a router, a switcher, a multiplexer, a hub, a modem, a network bridge, a repeater, a firewall, a proxy device and/or the like. The network 30 or the network 50 may include a physical link, for example, a coaxial cable link, a twisted-pair cable link, an optical fiber, a combination thereof and/or the like. The network 30 and the network 40 may include a wireless link, for example, a cellular link, a satellite link, a Wi-Fi link and/or the like.

The provider network 20 may further include a plurality of content delivery network (CDN) servers 80. Each CDN server 80 may be configured to provide processing of various services, for example, storing content provided by the source server 70 and distributing the content to the viewer terminals 40.

The plurality of viewer terminals 40 or the plurality of live streamer terminals 60 may be configured to access content and a service of the provider network 20. The plurality of viewer terminals 40 or the plurality of live streamer terminals 60 may include any type of computing devices, for example, a mobile device, a tablet device, a laptop computer, a workstation, an intelligent device (for example, intelligent clothing, a smart watch, a smart loudspeaker, or smart glasses), virtual reality earphones, a gaming device, a set-top box, a digital streaming device, a robot, a vehicle-mounted terminal, a smart television, or a television box.

The plurality of viewer terminals 40 may be associated with one or more users. A single user may access the provider network 20 using one or more of the plurality of viewer terminals 40. The plurality of viewer terminals 40 may travel to various positions and use different networks to access the provider network 20.

Exemplarily, the viewer terminals 40 may output (such as display or present) content to a user. The content may include a video, audio, a comment, text data, an advertisement, and/or the like.

The plurality of live streamer terminals 60 may be associated with one or more users. A single user may access the provider network 20 using one or more of the plurality of live streamer terminals 60. The plurality of live streamer terminals 60 may travel to various positions and use different networks to access the provider network 20.

Exemplarily, a live streamer terminal 60 may provide a live streamer interface, and a live streamer may input information such as video information or audio information by using the live streamer interface. It can be easily understood that the video information or audio information can be uploaded to the provider network 20 and can be distributed to the viewer terminals 40 via the provider network 20. In addition, the live streamer terminals 60 may further output (such as display or present) content to a live streamer. The content may include a video, audio, a comment, text data, a virtual gift, and/or the like.

The live streamer terminals 60, the viewer terminals 40, the source server 70, the CDN server 80, etc. described above may be implemented by one or more computer devices 2. It can be easily understood that the computer device 2 may be configured to implement any aspect of the computer described herein.

Embodiment 1

Figure 2:
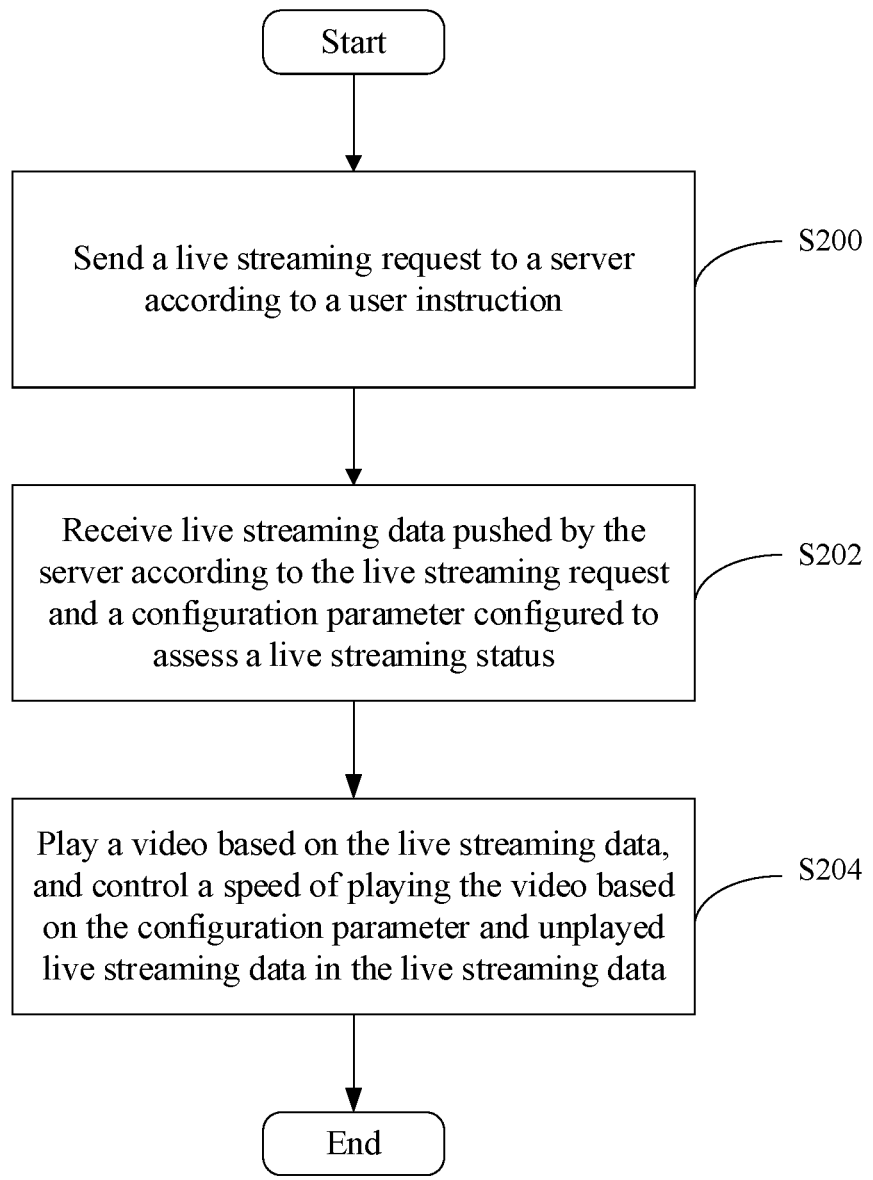
FIG. 2 is a flowchart schematically showing a method of video playing control according to Embodiment 1 of the present application.

FIG. 2 is a flowchart schematically showing a method of video playing control according to Embodiment 1 of the present application. This embodiment may be implemented in a computer device (used as a viewer terminal) 2. It can be understood that the flowchart in this method embodiment is not used to limit the order of execution of the steps.

As shown in FIG. 2, the method of video playing control may include steps S200 to S204.

In step S200, a live streaming request is sent to a server according to a user instruction.

In an exemplary embodiment, the computer device 2 may be configured with an input interface such as a touch screen, a physical keyboard, or a peripheral controller, etc. for receiving the user instruction. The user instruction refers to real-time playing or live streaming request information sent by a user via an input terminal. For example, when it is detected that the user selects and joins in a live streaming room A via the input interface, the computer device 2 sends a live streaming request for watching the live streaming room A to the server (such as a source server 70 in a provider network 2).

In step S202, live streaming data pushed by the server according to the live streaming request and a configuration parameter for assessing a live streaming status are received.

The server (such as the source server 70 in the provider network 2) receives the live streaming request provided by the computer device 2, pushes the corresponding live streaming data based on the live streaming request, and delivers the configuration parameter to the computer device 2. In some embodiments, the configuration parameter may be delivered to the computer device 2 before the live streaming data. The configuration parameter may be a threshold or reference value for assessing the live streaming status. The live streaming status may refer to a live streaming delay status. To be specific, the configuration parameter may be used as a reference value to assess a degree of a live streaming delay. For example, the configuration parameter is a threshold in terms of time. It can be easily understood that the live streaming delay is caused by many factors, and different live streaming rooms face different factors. Therefore, in some embodiments, different live streaming rooms may have different configuration parameters, so that the server may feed back a corresponding configuration parameter according to a live streaming room selected by a viewer. The configuration parameter is determined by the server according to a type of a live streaming scenario, for example, live sports streaming, a live countdown, and other live streaming scenarios requiring a high real-time performance, and the configuration parameter may be set to a relatively small value. For a live streaming scenario not requiring a high real-time performance, the configuration parameter may be set to a relatively large value.

The configuration parameter may be obtained in a plurality of manners, such as manners as follows: The server may set different configuration parameters for various live streaming rooms by detecting a live streaming condition in each live streaming room within a period of time. Alternatively, the server may collect some network parameters of each live streaming room online, and adjust configuration parameters of each live streaming room according to the network parameters.

To make it clearer, an example in which the computer device 2 sends the live streaming request for watching the live streaming room A to the source server 70 is used for description. The computer device 2 sends the live streaming request for watching the live streaming room A to the source server 70. After receiving the live streaming request for watching the live streaming room A, the source server 70 continuously pushes a current time point and subsequently received live streaming data to the computer device 2 via a CDN server nearest to the computer device 2.

In step S204, the live streaming data is played, and a video playing speed is controlled according to the configuration parameter and unplayed live streaming data in the live streaming data.

The unplayed live streaming data is live streaming data that is already received by the computer device 2 but has not been played. During playing of the live streaming data, the video playing speed is controlled according to the configuration parameter and the unplayed live streaming data.

It can be easily understood that, in this embodiment of the present application, comparison is performed according to the configuration parameter and the unplayed live streaming data, and the live video playing speed is controlled according to a comparison result. The playing speed may be controlled when no frame skipping occurs in a live video streaming (because frame skipping can speed up video playing but causes a problem of inconsistent video images), to get a greater live video playing speed, so that the unplayed live streaming data is not backlogged, thereby reducing a time difference between video pushing on a live streamer terminal and video receiving on a user terminal. Therefore, a feedback can be returned in time during interaction between a live streamer and a viewer, to increase the number of effective communications and interactions between the live streamer and the viewer in live video streaming, and strengthen the atmosphere of the live streaming.

Embodiment 2

Figure 3:
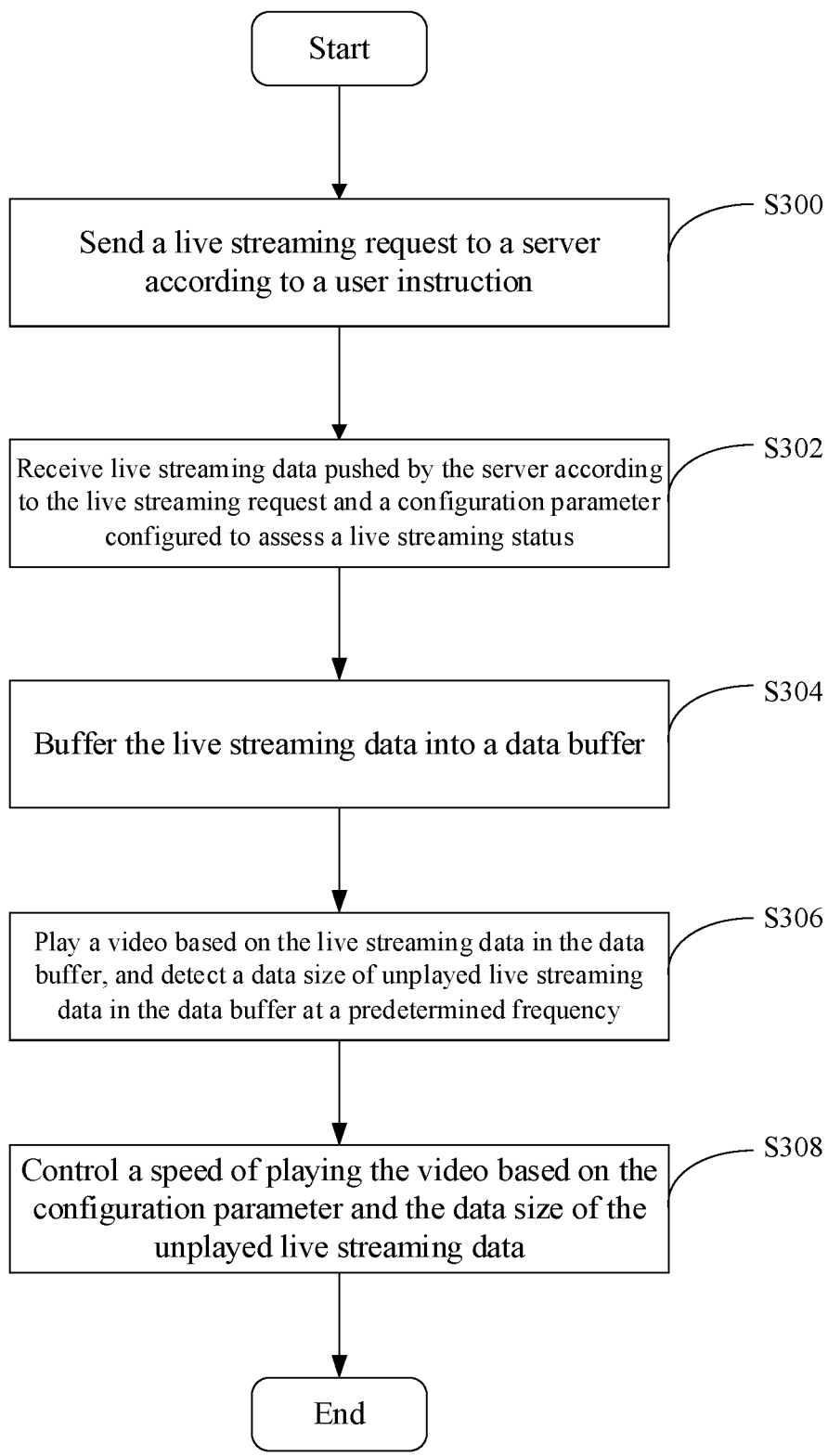
FIG. 3 is a flowchart schematically showing a method of video playing control according to Embodiment 2 of the present application.

FIG. 3 is a flowchart schematically showing a method of video playing control according to Embodiment 2 of the present application.

As shown in FIG. 3, the method of video playing control may include steps S300 to S304.

In step S300, a live streaming request is sent to a server according to a user instruction.

The live streaming request includes a channel identifier of a target live streaming channel, and the channel identifier is used to instruct the server to return a configuration parameter adapted for the target live streaming channel.

In an exemplary embodiment, the computer device 2 sends, to the server according to the user instruction, a live streaming request carrying the channel identifier of the target live streaming channel (such as a target live streaming room or a video chat object). The server may determine the target live streaming channel corresponding to the live streaming request according to the channel identifier, determine, according to the target live streaming channel, the configuration parameter configured in the server, and send the configuration parameter to the computer device 2 via a route of the live streaming request.

In step S302, live streaming data pushed by the server according to the live streaming request and a configuration parameter for assessing a live streaming status are received.

The configuration parameter is determined by the server according to a type of a live streaming scenario, for example, live sports streaming, a live countdown, and other live streaming scenarios requiring a high real-time performance, and the configuration parameter may be set to a relatively small value. For a live streaming scenario not requiring a high real-time performance, the configuration parameter may be set to a relatively large value.

For a live streaming scenario not requiring a high real-time performance, the configuration parameter may alternatively be determined by the server according to a plurality of network parameters. The plurality of network parameters include network transmission quality corresponding to the target live streaming channel and/or a working status of the server. In an exemplary embodiment, the configuration parameter may be configured according to a plurality of network factors of a corresponding live streaming room, for example, issues on a network itself of the live streaming room, for example: a bandwidth and a transmission distance, a network jitter and congestion control, buffering of a group of pictures (GOP) of a server, buffers in various links, a size of a slice and data processing performance in a hypertext transfer protocol (HTTP) live streaming (HLS) protocol, or other network factors. The configuration parameter may alternatively be configured according to a plurality of factors in live video transmission, for example: video retouching, video clipping and stretching, video encoding and decoding, video rendering, or other factors.

In step S304, the live streaming data is buffered into a data buffer.

The data buffer is used to temporarily store the live streaming data pushed by the server for reading, and the data buffer is further used to prevent a network jitter, prevent jerkiness in decoding, and avoid artifacts due to forced frame drops, to achieve an effect of synchronized soundtracks and pictures and an effect of preventing jerkiness in rendering in live video streaming.

In step S306, the live streaming data in the data buffer is played, and a data size of unplayed live streaming data in the data buffer is detected at a predetermined frequency.

After operations such as protocol parsing, decapsulation, decoding (video and audio decoding), synchronization of soundtracks and pictures, etc. are performed on the live streaming data, the live streaming data is input into a video playing terminal device for video playing, and the unplayed live streaming data in the data buffer is detected at the predetermined frequency, to obtain the data size of the unplayed live streaming data in the buffer. The predetermined frequency may be set dynamically according to different application scenarios. For example, in a scenario of a live webcast or a video chat, the predetermined frequency may be 1 time per second. The predetermined frequency may be 0.1 time per second if there is a live streaming scenario requiring a high real-time performance such as live sports streaming.

In step S308, the video playing speed is controlled according to the configuration parameter and the data size of the unplayed live streaming data.

The video playing terminal device is controlled to play the live streaming video according to the data size of the unplayed live streaming data and a pre-specified protocol of the video playing terminal device.

Figure 4:
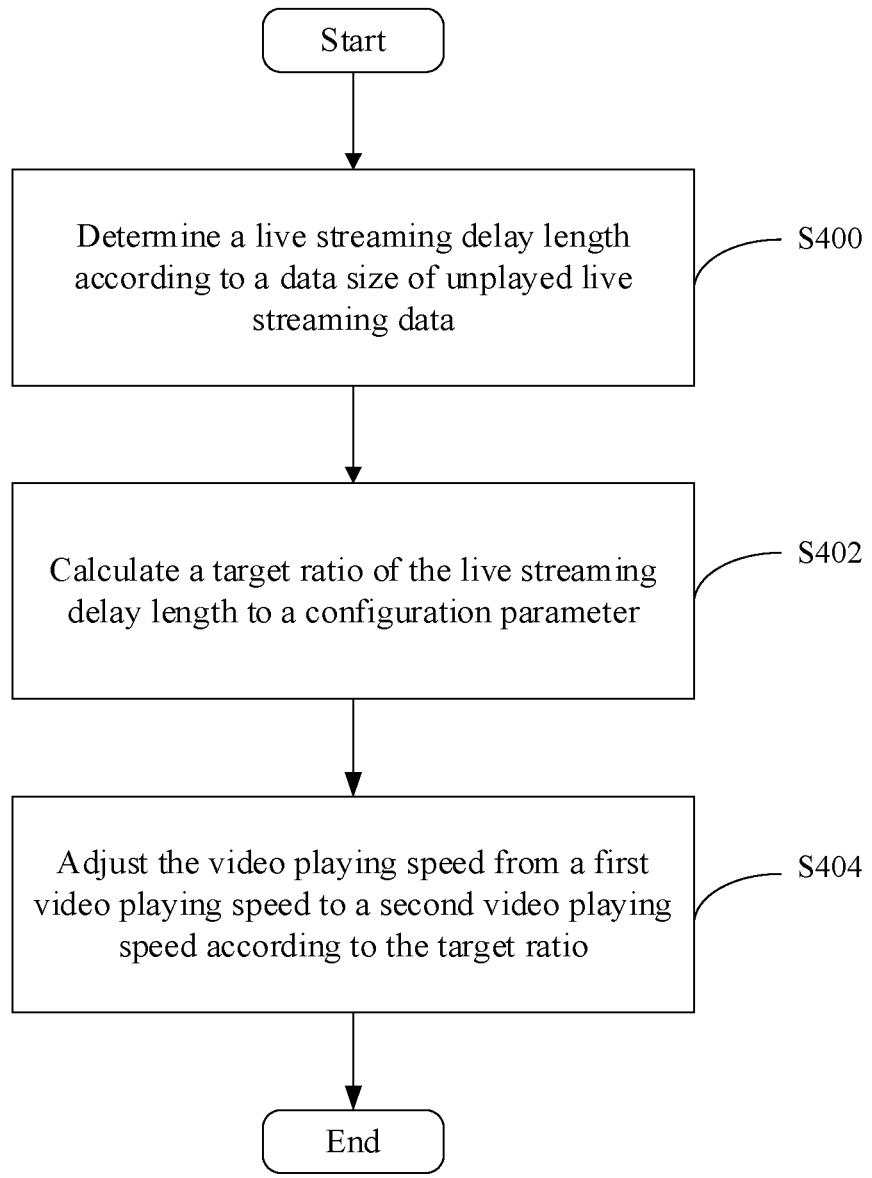
FIG. 4 is a flowchart schematically showing details of step S404.

As shown in FIG. 4, step S308 may include steps S400 to S404. In step S400, a live streaming delay duration is determined according to the data size of the unplayed live streaming data. In step S402, a target ratio of the live streaming delay duration to the configuration parameter is calculated. In step S404, the video playing speed is adjusted from a first video playing speed to a second video playing speed according to the target ratio.

Exemplarily, steps such as protocol parsing, decapsulation, decoding (video and audio decoding), etc. are performed on the unplayed live streaming data, to obtain the live streaming delay duration of a live streaming video corresponding to the unplayed live streaming data. The target ratio is obtained by calculating a ratio of the live streaming delay duration to the configuration parameter. The target ratio is the ratio of the live streaming delay duration to the configuration parameter. The video playing terminal device is controlled according to the target ratio to control current video playing data.

Figure 5:
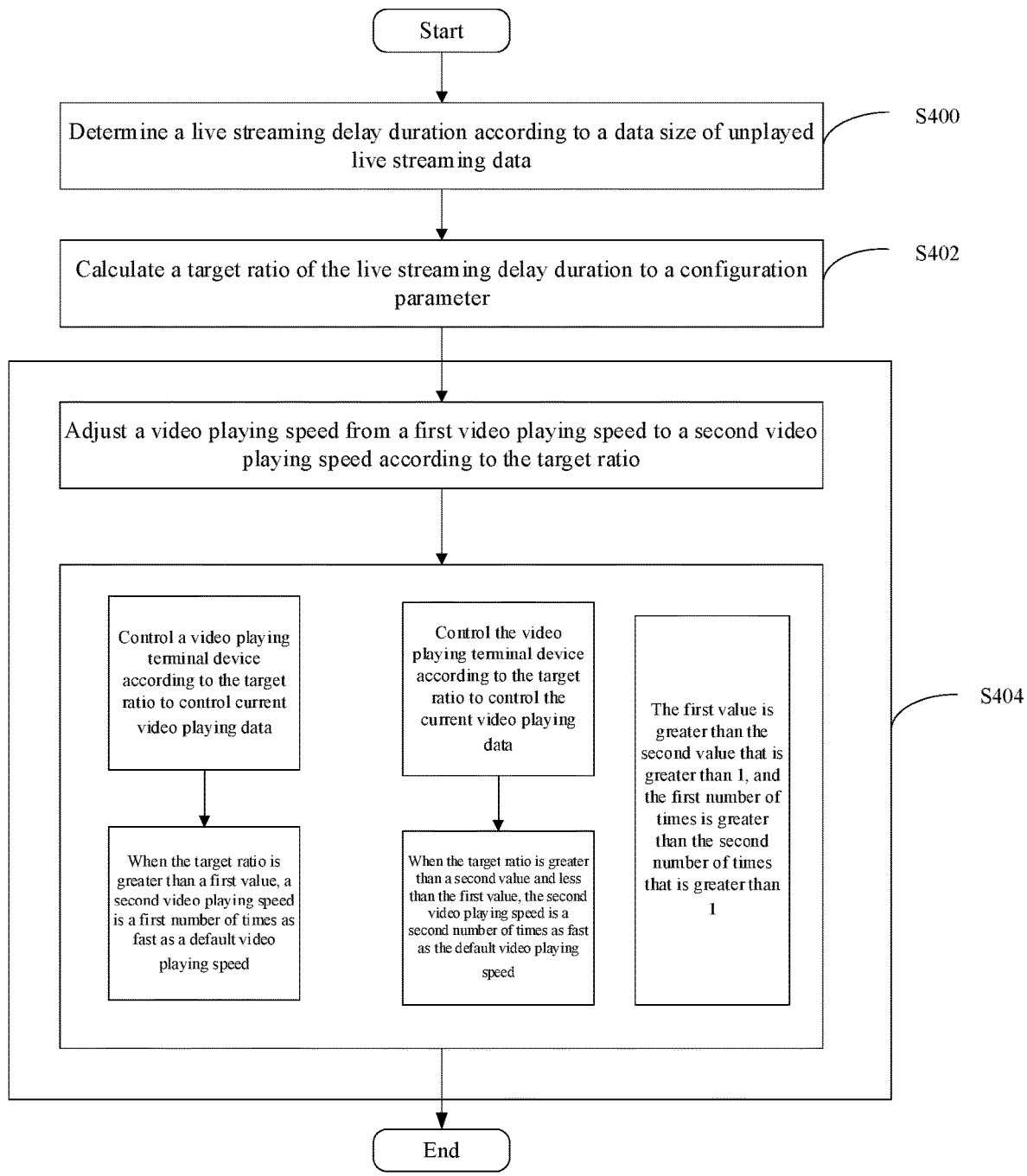
FIG. 5 is a flowchart schematically showing details of step S404.

As shown in FIG. 5, the video playing speed is adjusted from the first video playing speed to the second video playing speed according to the target ratio. When the target ratio is greater than a first value, the second video playing speed is a first number of times as fast as a default video playing speed. When the target ratio is greater than a second value and less than the first value, the second video playing speed is a second number of times as fast as the default video playing speed. The first value is greater than the second value that is greater than 1, and the first number of times is greater than the second number of times that is greater than 1.

Exemplarily, the first value may be set to 2, that is, the live streaming delay duration is two times the configuration parameter. It is started with 1.1 times playing speed, and the first number of times may be set to 1.1. The second value may be set to 1.5, that is, the live streaming delay duration is 1.5 times the configuration parameter. It is started with 1.05 times playing speed is started, and the second number of times may be set to 1.05.

In an exemplary embodiment, the second video playing speed is 1 time to 1.1 times as fast as the default video playing speed, to ensure that a video playing data adjustment strategy is carried out without a viewer noticing. It should be noted that the default video playing speed may be a video recording speed on a live streamer terminal.

This embodiment is applicable to implementing an imperceptible frame chasing technology in a plurality of scenarios, for example, a live webcast and a video chat, or is applicable to a live streaming scenario requiring a high real-time performance such as live sports streaming. The so-called imperceptible frame chasing technology is the method of video playing control described in this embodiment. When there is a delay in playing, a playing speed of subsequent video data (that is, a frame rate of subsequent frames) is continuously adjusted to gradually reduce a time difference between video pushing on a live streamer terminal and video playing on a viewer terminal and finally to basically achieve synchronization of pictures on the live streamer terminal and the viewer terminal.

For example, in live sports streaming that requires both a high real-time performance and continuity of pictures, when a video freeze occurs, if a video is still to be played at a default speed, there will always be a relatively large time difference between pictures on a live streamer terminal (which is an on-site video recording device) and a viewer terminal caused by the freeze. If some frames are dropped to achieve synchronized pictures, some pictures will inevitably be lost. Both requirements can be met by using the method described in this embodiment. When a video freeze occurs, the frame chasing technology is used. To be specific, a speed of playing unplayed live streaming data is continuously adjusted (where when the speed is in units of frame, a frame rate is continuously adjusted) according to unplayed live streaming data in live streaming data and a configuration parameter. Therefore, when each frame is determined to be played, a time difference between a live streamer terminal and a viewer terminal is gradually reduced, and finally, synchronization of pictures on the live streamer terminal and the viewer terminal is basically achieved.

In addition, the applicant finds that, fine tuning of a default playing speed within ±10% is basically imperceptible for human eyes. Therefore, to further make a playing speed more stable, a frame rate can be continuously adjusted, and an increase range of the rate is 10% or less. Certainly, the 10% is not used to limit this embodiment. For example, if there is a requirement for a high real-time performance, the increase range of the frame rate may be increased, to further improve frame chasing efficiency, so as to implement synchronization of pictures on the live streamer terminal and the viewer terminal as soon as possible.

Figure 6:
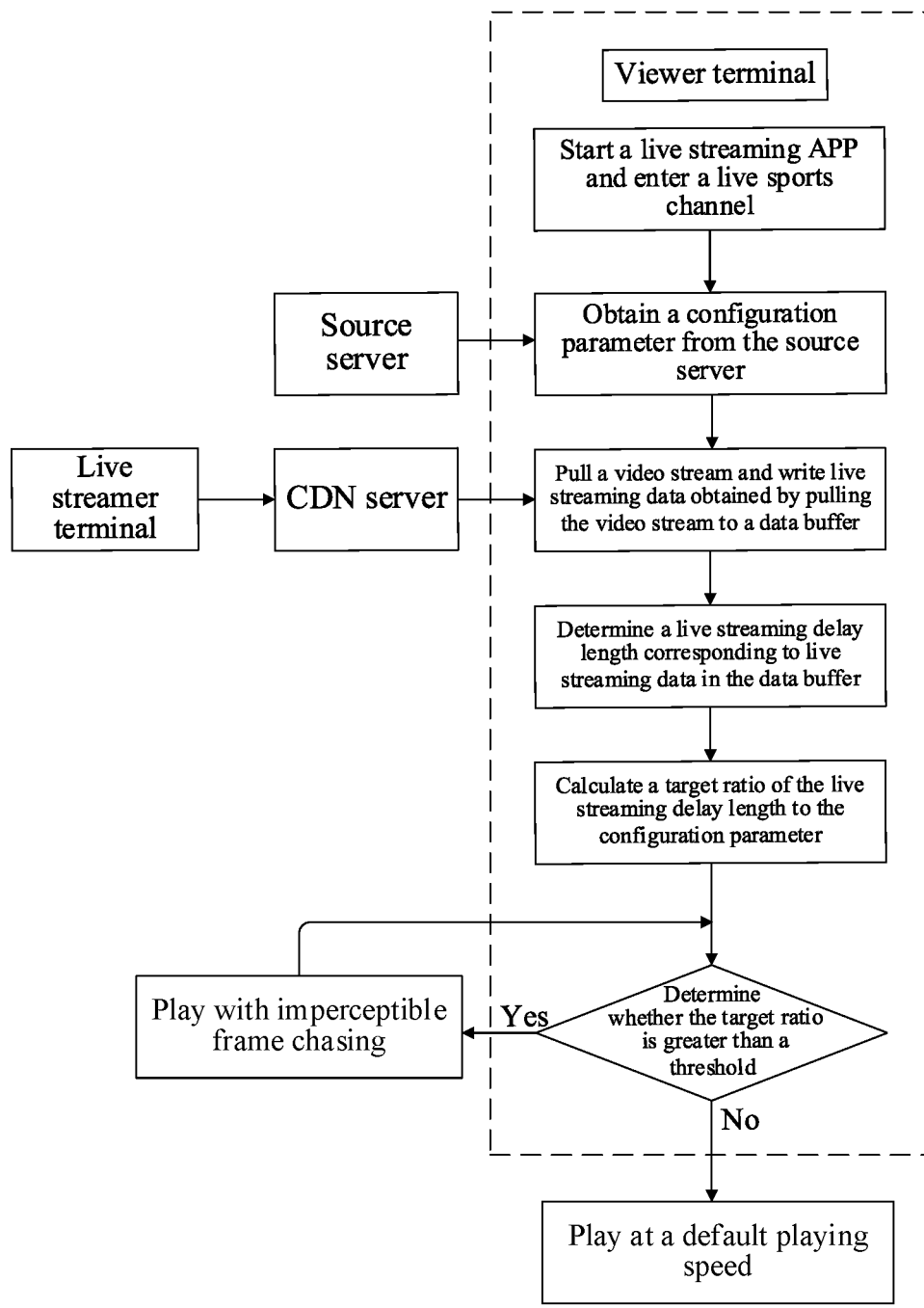
FIG. 6 is a flowchart schematically showing a method of video playing control according to Embodiment 2 of the present application.

As shown in FIG. 6, a viewer terminal starts a live streaming APP and enters a live sports channel, receives a configuration parameter associated with the live sports channel that is provided by a source server, pulls a video stream to obtain video data of the live sports channel from a CDN server, and writes the live streaming data obtained by pulling the video stream to a data buffer; obtains a live streaming delay duration corresponding to unplayed live streaming data in the data buffer at a preset frequency; and calculates a target ratio of the live streaming delay duration to the configuration parameter, and determines whether to perform a frame chasing operation on the unplayed live streaming data according to the target ratio.

Embodiment 3

Figure 7:
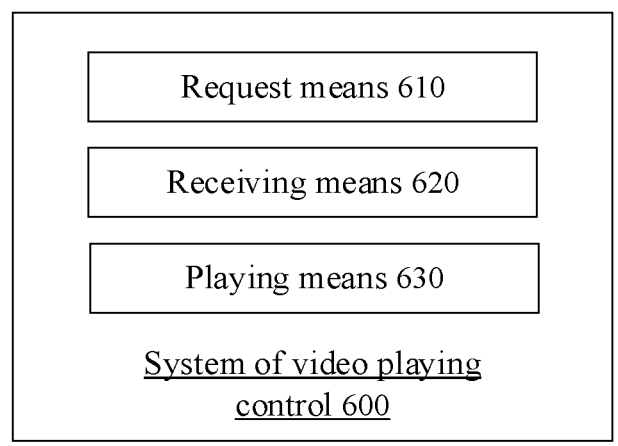
FIG. 7 is a block diagram schematically showing a system of video playing control according to Embodiment 3 of the present application.

FIG. 7 is a block diagram schematically showing a system of video playing control according to Embodiment 3 of the present application. The system of video playing control may be divided into one or more program means, and the one or more program means are stored in a storage medium, and are executed by one or more processors to implement the embodiments of the present application. The program means referred to in the embodiments of the present application refer to a series of computer-readable instruction segments that can complete a specific function. The functions of various program means in this embodiment will be specifically described in the following description.

As shown in FIG. 7, the system of video playing control 600 may include a request means 610, a receiving means 620, and a playing means 630.

The request means 610 is configured to send a live streaming request to a server according to a user instruction.

In an exemplary embodiment, the request means 610 is further configured to: send a live streaming request to a server according to a user instruction, where the live streaming request includes a channel identifier of a target live streaming channel, and the channel identifier is used to instruct the server to return a configuration parameter corresponding to the target live streaming channel.

The receiving means 620 is configured to receive live streaming data pushed by the server according to the live streaming request and a configuration parameter for assessing a live streaming status.

In an exemplary embodiment, the receiving means 620 is further configured to: receive the live streaming data pushed by the server according to the live streaming request and the configuration parameter for assessing the live streaming status, where the configuration parameter is determined by the server according to a type of a live streaming scenario.

The playing means 630 is configured to: play the live streaming data, and control a video playing speed according to the configuration parameter and unplayed live streaming data in the live streaming data.

In an exemplary embodiment, the playing means 630 is further configured to: play the live streaming data, and control the video playing speed according to the configuration parameter and the unplayed live streaming data in the live streaming data, which includes: buffering the live streaming data into a data buffer; playing the live streaming data in the data buffer, and detecting a data size of unplayed live streaming data in the data buffer at a predetermined frequency; and controlling the video playing speed according to the configuration parameter and the data size of the unplayed live streaming data.

In an exemplary embodiment, the playing means 630 is further configured to: control the video playing speed according to the configuration parameter and the data size of the unplayed live streaming data, which includes: determining a live streaming delay duration according to the data size of the unplayed live streaming data; calculating a target ratio of the live streaming delay duration to the configuration parameter; and adjusting the video playing speed from a first video playing speed to a second video playing speed according to the target ratio.

In an exemplary embodiment, the playing means 630 is further configured to: adjust the video playing speed from a first video playing speed to a second video playing speed according to the target ratio, where when the target ratio is greater than a first value, the second video playing speed is a first number of times as fast as a default video playing speed; and when the target ratio is greater than a second value and less than the first value, the second video playing speed is a second number of times as fast as the default video playing speed, where the first value is greater than the second value that is greater than 1, and the first number of times is greater than the second number of times that is greater than 1.

In an exemplary embodiment, the playing means 630 is further configured to: adjust the video playing speed from a first video playing speed to a second video playing speed according to the target ratio, where when the target ratio is greater than a first value, the second video playing speed is a first number of times as fast as a default video playing speed; and when the target ratio is greater than a second value and less than the first value, the second video playing speed is a second number of times as fast as the default video playing speed, where the first value is greater than the second value that is greater than 1, the first number of times is greater than the second number of times that is greater than 1, and the second video playing speed is 1 time to 1.1 times as fast as the default video playing speed.

Embodiment 4

Figure 8:
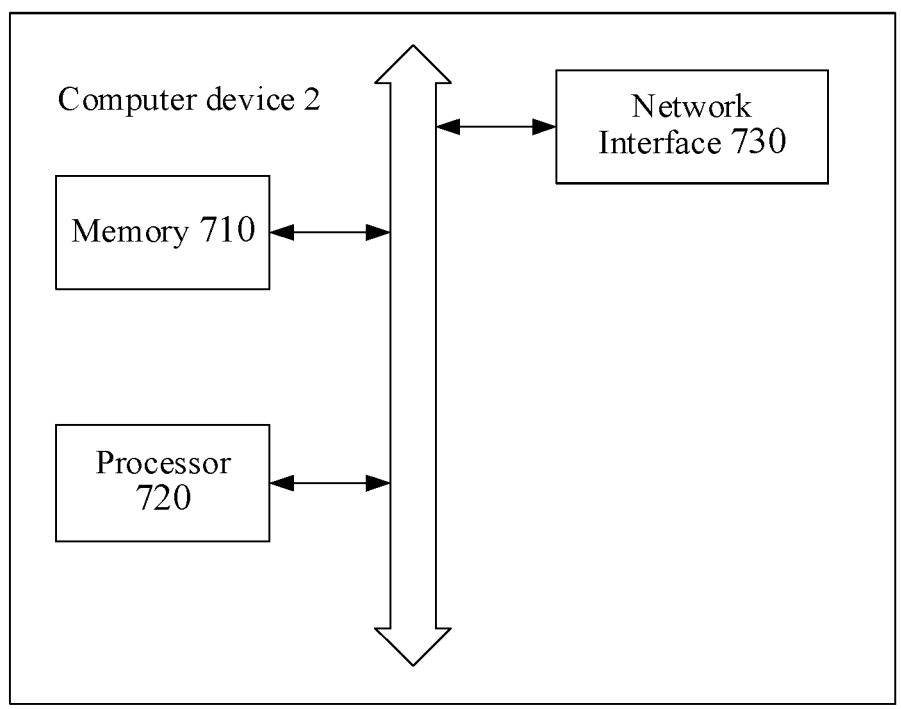
FIG. 8 is a schematic diagram schematically showing a hardware architecture of a computer device suitable for implementing a method of video playing control according to Embodiment 4 of the present application.

FIG. 8 is a schematic diagram schematically showing a hardware architecture of a computer device suitable for implementing a method of video playing control according to Embodiment 4 of the present application. In this embodiment, a computer device 2 is a device that may automatically perform numerical calculation and/or information processing according to preset or pre-stored instructions. For example, the computer device may be a mobile device, a tablet device, a laptop computer, a gaming device, a set-top box, a digital streaming device, a smart television, a television box, a rack server, a blade server, a tower server, or a cabinet server (including an independent server or a server cluster composed of a plurality of servers), etc. As shown in FIG. 7, the computer device 2 at least includes, but is not limited to: a memory 710, a processor 720, and a network interface 730 that can be communicatively connected to each other via a system bus. In the components:

the memory 710 includes at least one type of computer-readable storage medium, and the readable storage medium includes a flash memory, a hard disk, a multimedia card, a card-type memory (e.g., an SD or DX memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, etc. In some embodiments, the memory 710 may be an internal storage means of the computer device 2, for example, a hard disk or a memory of the computer device 2. In some other embodiments, the memory 710 may alternatively be an external storage device of the computer device 2, for example, a plug-in hard disk disposed on the computer device 2, a smart media card (SMC for short), a secure digital (SD for short) card, and a flash card, etc. Certainly, the memory 710 may alternatively include both the internal storage means of the computer device 2 and the external storage device thereof. In this embodiment, the memory 710 is generally configured to store an operating system and various application software installed in the computer device 2, such as program codes for the method of video playing control. In addition, the memory 710 may be configured to temporarily store various types of data that has been output or will be output.

The processor 720 may be, in some embodiments, a central processing unit (CPU for short), a controller, a microcontroller, a microprocessor, or other data processing chips. The processor 720 is generally configured to control overall operation of the computer device 2, for example, executing control, processing, etc. related to data exchange or communication with the computer device 2. In this embodiment, the processor 720 is configured to run program codes stored in the memory 710 or process data.

The network interface 730 may include a wireless network interface or a wired network interface, and the network interface 730 is generally configured to establish a communication connection between the computer device 2 and other computer devices. For example, the network interface 730 is configured to connect the computer device 2 to an external terminal through a network, and establish a data transmission channel, a communication link, etc. between the computer device 2 and the external terminal. The network may be a wireless or wired network such as Intranet, Internet, Global System of Mobile Communications (GSM for short), wideband code division multiple access (WCDMA for short), a 4G network, a 5G network, Bluetooth, or Wi-Fi etc.

It should be noted that FIG. 8 shows only a computer device having components 710 to 730, but it should be understood that not all of the illustrated components are required to be implemented, and more or fewer components may be implemented instead.

In this embodiment, the method of video playing control stored in the memory 710 may also be divided into one or more program means and executed by one or more processors (the processor 720 in this embodiment) to implement the present application.

Embodiment 5

This embodiment further provides a computer-readable storage medium having stored thereon computer-readable instructions, where when the computer-readable instructions are executed by a processor, the following steps are implemented: sending a live streaming request to a server according to a user instruction; receiving live streaming data pushed by the server according to the live streaming request and a configuration parameter for assessing a live streaming status; and playing the live streaming data, and controlling a video playing speed according to the configuration parameter and unplayed live streaming data in the live streaming data.

In this embodiment, the computer-readable storage medium includes a flash memory, a hard disk, a multimedia card, a card-type memory (e.g., an SD or DX memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, etc. In some embodiments, the computer-readable storage medium may be an internal storage unit of the computer device, for example, a hard disk or a memory of the computer device. In some other embodiments, the computer-readable storage medium may alternatively be an external storage device of the computer device, for example, a plug-in hard disk disposed on the computer device, a smart media card (SMC for short), a secure digital (SD for short) card, and a flash card, etc. Certainly, the computer-readable storage medium may alternatively include both the internal storage unit of the computer device and the external storage device thereof. In this embodiment, the computer-readable storage medium is generally configured to store an operating system and various application software installed in the computer device, such as program codes for the method of video playing control in the embodiments. In addition, the computer-readable storage medium may be configured to temporarily store various types of data that has been output or will be output.

It will be apparent to those skilled in the art that the various means or steps in the embodiments of the present application can be implemented by a general-purpose computing device that can be centralized on a single computing device or distributed across a network formed by a plurality of computing devices. Optionally, they may be implemented by program codes executable by the computing device, such that they may be stored in a storage device and executed by the computing device, and in some cases, the steps shown or described may be performed in a sequence different from the sequence described herein, or they may be respectively fabricated into individual integrated circuit means, or a plurality of means or steps thereof may be implemented as a single integrated circuit means. In this way, the embodiments of the present application are not limited to any specific combination of hardware and software.

The foregoing descriptions are merely illustrative of preferred embodiments of the present application, and are not intended to limit the patent scope of the present application. Any equivalent structure or equivalent process transformation made using the contents of the description and accompanying drawings of the present application, or any direct or indirect application thereof in other related technical fields shall equally fall within the patent protection scope of the present application.

What is claimed is:

1. A method of controlling playing videos, comprising:
sending a live streaming request to a server according to a user instruction;
receiving live streaming data and a configuration parameter from the server, wherein the live streaming data are pushed by the server based on the live streaming request, and the configuration parameter is configured to assess a live streaming status;
playing a video based on the live streaming data; and
controlling a speed of playing the video based on the configuration parameter and unplayed live streaming data in the live streaming data, wherein the controlling a speed of playing the video based on the configuration parameter and unplayed live streaming data in the live streaming data comprises:
buffering the live streaming data into a data buffer;
playing the video based on the live streaming data in the data buffer;
detecting a data size of the unplayed live streaming data in the data buffer at a predetermined frequency;
controlling the speed of playing the video based on the configuration parameter and the data size of the unplayed live streaming data, wherein the controlling the speed of playing the video based on the configuration parameter and the data size of the unplayed live streaming data further comprises;
determining a live streaming delay duration based on the data size of the unplayed live streaming data;
determining a target ratio of the live streaming delay duration to the configuration parameter; and
adjusting the speed of playing the video from a first speed to a second speed based on the target ratio.

2. The method of claim 1, wherein the live streaming request comprises a channel identifier of a target live streaming channel, and the channel identifier is configured to instruct the server to return the configuration parameter adapted for the target live streaming channel.

3. The method of claim 1, wherein the configuration parameter is determined by the server based on a type of a live streaming scenario.

4. The method of claim 1,
wherein when the target ratio is greater than a first value, the second speed is a first number of times as fast as a default video playing speed;
wherein when the target ratio is greater than a second value and less than the first value, the second speed is a second number of times as fast as the default video playing speed; and
wherein the first value is greater than the second value and the second value is greater than 1, and wherein the first number of times is greater than the second number of times and the second number of times is greater than 1.

5. The method of claim 1, wherein the second speed is 1 time to 1.1 times as fast as a default video playing speed.

6. A computer device, comprising a memory, a processor, and computer-readable instructions stored on the memory and capable of running on the processor, wherein the computer-readable instructions, upon executed by the processor, implement operations comprising:
sending a live streaming request to a server according to a user instruction;
receiving live streaming data and a configuration parameter from the server, wherein the live streaming data are pushed by the server based on the live streaming request, and the configuration parameter is configured to assess a live streaming status;
playing a video based on the live streaming data; and
controlling a speed of playing the video based on the configuration parameter and unplayed live streaming data in the live streaming data, wherein the controlling a speed of playing the video based on the configuration parameter and unplayed live streaming data in the live streaming data comprises:
buffering the live streaming data into a data buffer;
playing the video based on the live streaming data in the data buffer;
detecting a data size of the unplayed live streaming data in the data buffer at a predetermined frequency;
controlling the speed of playing the video based on the configuration parameter and the data size of the unplayed live streaming data, wherein the controlling the speed of playing the video based on the configuration parameter and the data size of the unplayed live streaming data further comprises;
determining a live streaming delay duration based on the data size of the unplayed live streaming data;
determining a target ratio of the live streaming delay duration to the configuration parameter; and
adjusting the speed of playing the video from a first speed to a second speed based on the target ratio.

7. The computer device of claim 6, wherein the live streaming request comprises a channel identifier of a target live streaming channel, and the channel identifier is used to instruct the server to return the configuration parameter adapted for the target live streaming channel.

8. The computer device of claim 6, wherein the configuration parameter is determined by the server based on a type of a live streaming scenario.

9. The computer device of claim 6,
wherein when the target ratio is greater than a first value, the second speed is a first number of times as fast as a default video playing speed;
wherein when the target ratio is greater than a second value and less than the first value, the second speed is a second number of times as fast as the default video playing speed; and
wherein the first value is greater than the second value and the second value is greater than 1, and wherein the first number of times is greater than the second number of times and the second number of times is greater than 1.

10. The computer device of claim 6, wherein the second speed is 1 time to 1.1 times as fast as a default video playing speed.

11. A non-transitory computer-readable storage medium, storing computer-readable instructions, wherein the computer-readable instructions are executable by at least one processor to cause the at least one processor to perform operations comprising:
- sending a live streaming request to a server according to a user instruction;
- receiving live streaming data and a configuration parameter from the server, wherein the live streaming data are pushed by the server based on the live streaming request, and the configuration parameter is configured to assess a live streaming status;
- playing a video based on the live streaming data; and
- controlling a speed of playing the video based on the configuration parameter and unplayed live streaming data in the live streaming data, wherein the controlling a speed of playing the video based on the configuration parameter and unplayed live streaming data in the live streaming data comprises:
- buffering the live streaming data into a data buffer;
- playing the video based on the live streaming data in the data buffer;
- detecting a data size of the unplayed live streaming data in the data buffer at a predetermined frequency;
- controlling the speed of playing the video based on the configuration parameter and the data size of the unplayed live streaming data, wherein the controlling the speed of playing the video based on the configuration parameter and the data size of the unplayed live streaming data further comprises;
- determining a live streaming delay duration based on the data size of the unplayed live streaming data;
- determining a target ratio of the live streaming delay duration to the configuration parameter; and
- adjusting the speed of playing the video from a first speed to a second speed based on the target ratio.

12. The non-transitory computer-readable storage medium of claim 11, wherein the live streaming request comprises a channel identifier of a target live streaming channel, and the channel identifier is configured to instruct the server to return the configuration parameter adapted for the target live streaming channel.

13. The non-transitory computer-readable storage medium of claim 11, wherein the configuration parameter is determined by the server based on a type of a live streaming scenario.

* * * * *